(12) United States Patent
Mestler et al.

(10) Patent No.: US 10,870,494 B2
(45) Date of Patent: *Dec. 22, 2020

(54) FLIGHT CONTROLLER WITH GENERATOR CONTROL

(71) Applicant: Skyfront Corp., Menlo Park, CA (US)

(72) Inventors: Troy Mestler, San Francisco, CA (US); Anton Stepanov, Jersey City, NJ (US)

(73) Assignee: Skyfront Corp., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/168,636

(22) Filed: Oct. 23, 2018

(65) Prior Publication Data

US 2019/0055029 A1    Feb. 21, 2019

Related U.S. Application Data

(63) Continuation of application No. 15/080,400, filed on Mar. 24, 2016, now Pat. No. 10,144,527.

(60) Provisional application No. 62/137,915, filed on Mar. 25, 2015.

(51) Int. Cl.
*B64D 31/06* (2006.01)
*B64C 39/02* (2006.01)
*B64D 27/02* (2006.01)

(52) U.S. Cl.
CPC ............ *B64D 31/06* (2013.01); *B64C 39/024* (2013.01); *B64C 2201/042* (2013.01); *B64C 2201/108* (2013.01); *B64C 2201/141* (2013.01); *B64D 2027/026* (2013.01); *Y02T 50/60* (2013.01)

(58) Field of Classification Search
CPC .................................................. B64C 39/024
See application file for complete search history.

(56) References Cited

U.S. PATENT DOCUMENTS

| 2,965,977 | A | * | 12/1960 | Crabb | G09B 9/18 434/54 |
| 3,280,296 | A | * | 10/1966 | Nelson | B23K 9/0732 219/137 R |
| 3,309,589 | A | * | 3/1967 | Luyten | G05D 3/1472 318/663 |
| 3,350,882 | A | * | 11/1967 | Leising | B60T 13/573 60/553 |
| 4,610,484 | A | * | 9/1986 | Amberg | B60T 8/00 303/113.4 |
| 4,989,565 | A | * | 2/1991 | Shimomura | F02D 31/005 290/40 A |
| 5,297,759 | A | | 3/1994 | Tilbor | |
| 5,454,358 | A | | 10/1995 | Hattori | |

(Continued)

OTHER PUBLICATIONS

Kataoka, Yasuyuki, Non-Linear Control and Model Analysis of Trirotor UAV Model, 18th IFAC World Congress, Milano, Italy, (Aug. 28, 2011 ).

*Primary Examiner* — Jean Paul Cass
(74) *Attorney, Agent, or Firm* — Van Pelt, Yi & James LLP

(57) ABSTRACT

A system includes an electronic speed control throttle input from which an anticipated electrical power demand is determined. The system includes a controller that determines a throttle input for a generator in order to satisfy the anticipated electrical power demand. The system includes an electronic speed control throttle output providing a delayed electronic speed control throttle signal.

20 Claims, 9 Drawing Sheets

(56) References Cited

U.S. PATENT DOCUMENTS

| | | | | |
|---|---|---|---|---|
| 5,460,434 | A * | 10/1995 | Micke | B60T 8/1708 303/15 |
| 5,823,281 | A * | 10/1998 | Yamaguchi | B60K 6/387 180/65.235 |
| 5,899,830 | A * | 5/1999 | Tabata | F02D 11/105 123/399 |
| 6,175,785 | B1 * | 1/2001 | Fujisawa | B60K 6/442 701/22 |
| 6,404,163 | B1 | 6/2002 | Kapsokavathis | |
| 6,915,778 | B2 * | 7/2005 | Clemence | F02D 11/105 123/361 |
| 7,124,027 | B1 * | 10/2006 | Ernst, Jr. | G01S 13/931 701/301 |
| 7,522,982 | B2 * | 4/2009 | Le | B60R 21/0132 180/271 |
| 8,849,494 | B1 * | 9/2014 | Herbach | G05D 1/0297 701/24 |
| 8,874,301 | B1 * | 10/2014 | Rao | B60K 28/04 701/25 |
| 9,008,914 | B2 * | 4/2015 | Akiyama | B60T 7/12 701/41 |
| 9,139,310 | B1 | 9/2015 | Wang | |
| 9,174,649 | B1 * | 11/2015 | Johri | B62D 6/00 |
| 9,653,948 | B2 | 5/2017 | Polu | |
| 9,849,852 | B1 * | 12/2017 | Larner | B60R 21/0134 |
| 9,891,686 | B2 | 2/2018 | Jurski | |
| 9,953,535 | B1 * | 4/2018 | Canavor | G08G 1/164 |
| 10,144,527 | B2 * | 12/2018 | Mestler | B64C 39/024 |
| 2002/0158754 | A1 * | 10/2002 | Tabata | G08B 25/016 340/438 |
| 2003/0100975 | A1 * | 5/2003 | Hashimoto | F02D 11/107 701/1 |
| 2003/0117015 | A1 * | 6/2003 | Kuwajima | B60T 8/17616 303/150 |
| 2003/0133794 | A1 | 7/2003 | Otake | |
| 2005/0012386 | A1 * | 1/2005 | Nakano | B60T 8/172 303/114.1 |
| 2005/0151023 | A1 | 7/2005 | Ribbe | |
| 2007/0057113 | A1 | 3/2007 | Parks | |
| 2007/0247119 | A1 * | 10/2007 | Maehara | H02J 7/243 322/28 |
| 2007/0290646 | A1 * | 12/2007 | Hasenour | H02P 1/04 318/487 |
| 2009/0030574 | A1 * | 1/2009 | Yamakado | B60W 30/045 701/44 |
| 2009/0171538 | A1 * | 7/2009 | Kadota | B60W 20/00 701/51 |
| 2010/0125383 | A1 * | 5/2010 | Caouette | B63H 21/22 701/21 |
| 2011/0071705 | A1 | 3/2011 | Matuszeski | |
| 2011/0079166 | A1 | 4/2011 | Popa-Simil | |
| 2011/0180037 | A1 * | 7/2011 | Blom | F02P 5/1512 123/406.2 |
| 2011/0219893 | A1 | 9/2011 | Fiala | |
| 2011/0298310 | A1 * | 12/2011 | Ross | H02K 41/06 310/20 |
| 2013/0062457 | A1 * | 3/2013 | Deakin | H01Q 1/36 244/25 |
| 2013/0093625 | A1 | 4/2013 | Smith | |
| 2013/0110368 | A1 * | 5/2013 | Zagorski | B60T 7/22 701/70 |
| 2013/0147427 | A1 | 6/2013 | Polu | |
| 2013/0204512 | A1 * | 8/2013 | Mizuno | F02N 11/084 701/112 |
| 2014/0080430 | A1 * | 3/2014 | Lee | H04B 13/005 455/91 |
| 2014/0124621 | A1 | 5/2014 | Godzdanker | |
| 2014/0297155 | A1 | 10/2014 | Chen | |
| 2014/0346283 | A1 * | 11/2014 | Salyer | B64C 27/24 244/7 A |
| 2015/0057891 | A1 * | 2/2015 | Mudalige | B60W 10/00 701/42 |
| 2015/0316387 | A1 * | 11/2015 | Ichikawa | G01C 21/3658 701/532 |
| 2015/0336677 | A1 * | 11/2015 | Smaoui | H02J 7/0026 320/109 |
| 2015/0346722 | A1 | 12/2015 | Herz | |
| 2016/0009388 | A1 * | 1/2016 | Brotherton-Ratcliffe | B64C 27/20 244/17.13 |
| 2016/0039300 | A1 | 2/2016 | Wang | |
| 2016/0046387 | A1 * | 2/2016 | Frolov | B64B 1/00 244/59 |
| 2016/0050011 | A1 * | 2/2016 | Frolov | H04B 7/18506 455/431 |
| 2016/0082460 | A1 | 3/2016 | McMaster | |
| 2016/0133060 | A1 * | 5/2016 | Xu | G07B 1/00 705/13 |
| 2016/0152345 | A1 | 6/2016 | Molnar | |
| 2016/0156406 | A1 * | 6/2016 | Frolov | H04W 16/28 455/431 |
| 2016/0180126 | A1 | 6/2016 | Saleem | |
| 2016/0201778 | A1 * | 7/2016 | Baghdasarian | F16H 29/12 74/111 |
| 2016/0230680 | A1 * | 8/2016 | DeMarco | H02P 9/04 |
| 2016/0280386 | A1 | 9/2016 | Mestler | |
| 2016/0378109 | A1 | 12/2016 | Raffa | |
| 2017/0057297 | A1 * | 3/2017 | Takemori | B60C 11/03 |
| 2017/0069214 | A1 | 3/2017 | Dupray | |
| 2017/0148340 | A1 | 5/2017 | Popa-Simil | |
| 2017/0308749 | A1 * | 10/2017 | Tanno | B60C 11/00 |
| 2017/0330464 | A1 * | 11/2017 | Yoo | B60Q 1/30 |
| 2018/0144202 | A1 * | 5/2018 | Moosaei | G06K 9/6274 |
| 2018/0151066 | A1 * | 5/2018 | Oba | G08G 1/096725 |
| 2018/0175417 | A1 * | 6/2018 | Jung | H01M 8/04089 |
| 2018/0229705 | A1 * | 8/2018 | Farres | B60T 13/588 |
| 2019/0072188 | A1 * | 3/2019 | Lang | F16K 1/00 |

\* cited by examiner

FLIGHT CONTROLLER WITH GENERATOR CONTROL

CROSS REFERENCE TO OTHER APPLICATIONS

This application is a continuation of co-pending U.S. patent application Ser. No. 15/080,400, entitled FLIGHT CONTROLLER WITH GENERATOR CONTROL filed Mar. 24, 2016, which is incorporated herein by reference for all purposes, which claims priority to U.S. Provisional Application No. 62/137,915, entitled FLIGHT CONTROLLER FOR A SERIES-HYBRID MULTIROTOR AIRCRAFT filed Mar. 25, 2015 which is incorporated herein by reference for all purposes.

BACKGROUND OF THE INVENTION

Typically drone aircraft have been powered using power provided by an onboard battery. However, due to the limitation in the amount of energy able to be stored in a battery of a size and weight suitable for the drone aircraft, flight times of drone aircraft have been severely limited. In order to increase flight time, a gasoline engine may be utilized to take advantage of the higher energy density of gasoline. However, as compared to battery power, gasoline engines require an externally controlled throttle to provide power and cannot provide power as instantaneously. There is a lag between when engine throttle is increased and when full power corresponding to the increase engine throttle is delivered. To meet instantaneous power demand, a battery may be used in conjunction with the gasoline engine to allow the battery to bridge the gap in power during the throttle lag. However, there may be instances when battery power is unavailable or undesirable. For example, the battery in the hybrid battery-engine system may fail and it would be desirable to be able to operate the drone aircraft without reliance on battery power. For certain applications, the use of the battery is undesirable due to its added complexity, weight, and cost.

BRIEF DESCRIPTION OF THE DRAWINGS

Various embodiments of the invention are disclosed in the following detailed description and the accompanying drawings.

DETAILED DESCRIPTION

Figure 1A:
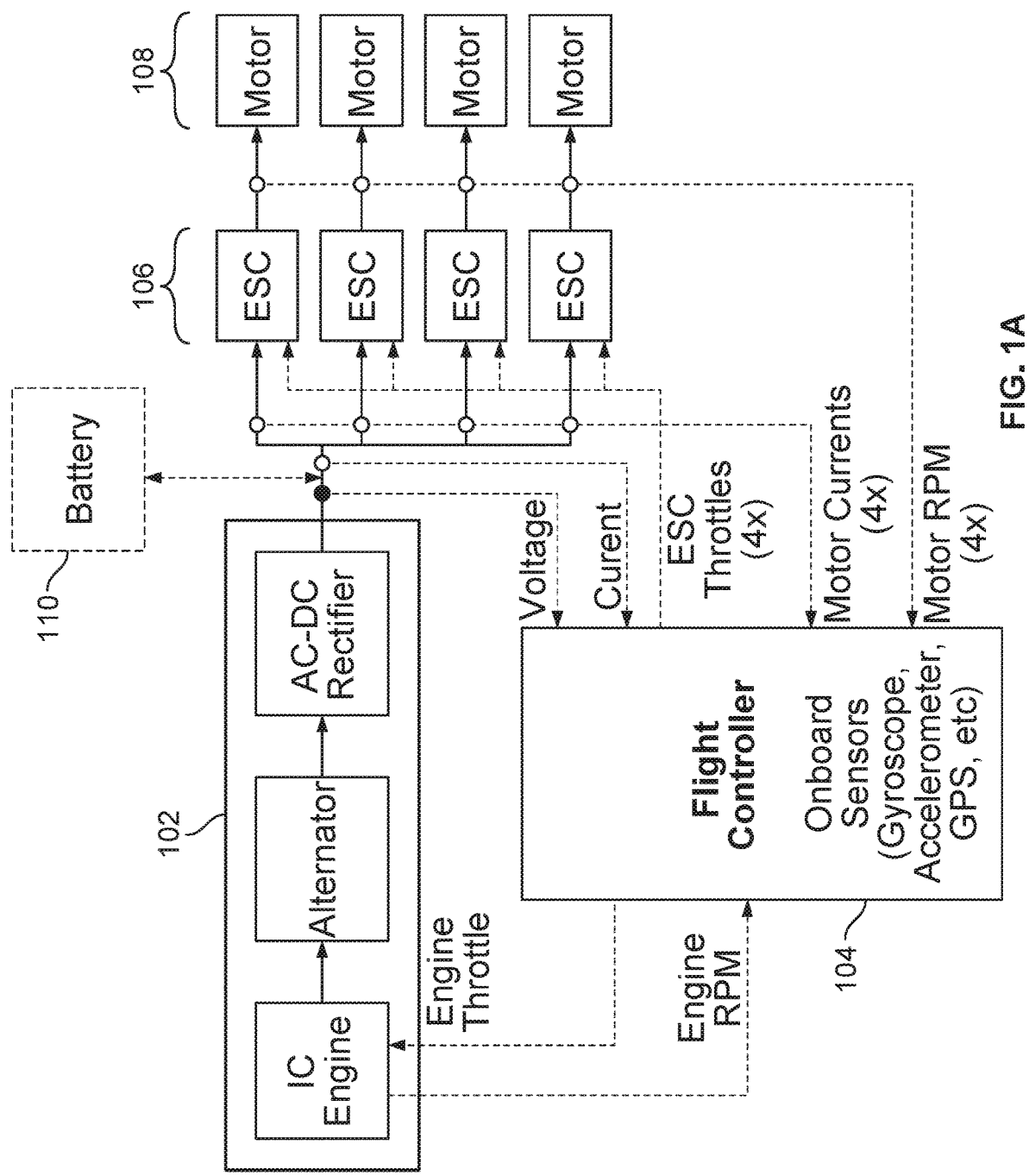
FIG. 1A is a diagram illustrating an embodiment of components of a multirotor aircraft system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Electric multirotor aircrafts include two or more propellers, with each propeller powered by an electric motor. A flight controller is typically an onboard computer that controls the flight dynamics of the aircraft by controlling the amount of electric power supplied to each electric motor. A well-known deficiency of battery powered multirotor aircrafts is their short flight time. A significant increase in electric multirotor flight time is possible if a series-hybrid power source, consisting of an electric generator (e.g., driven by a prime mover (genset)), is used to power the aircraft. An example of a prime mover is an internal combustion engine or a turbine engine. A series-hybrid multirotor is capable of much longer flight times because chemical fuels (e.g., gasoline, diesel, hydrogen, natural gas, etc.) have much higher energy density than current battery technologies.

The onboard engine of the aircraft requires a controller for the engine throttle, which regulates the torque and revolutions per minute (RPM) of the prime mover. The function of the controller is to set the throttle such that the engine operates at a desired RPM under varying load conditions. The throttle control has to respond to sudden changes in load power demand. Throttle controllers (e.g., governors) in current portable gensets may employ feedback to keep the engine RPM at a setpoint value. When an increase in power demand causes a decrease in engine RPM, the governor responds by increasing the throttle to bring the RPM back to the setpoint value. A shortcoming of feedback governors is that they can only respond to a disturbance after it has affected the system. Prime movers such as internal combustion engines and gas turbines that are used in gensets exhibit a considerable time delay (e.g., throttle lag) between changes in throttle and changes in power output. Throttle lag is mainly due to the time required to change the pressure in the intake manifold. As a result of throttle lag and the reliance on feedback, portable gensets can have settling times of several seconds or longer in response to a sudden change in power demand. The genset may even become stalled if either too much power is demanded by the load or power is demanded by the load too quickly.

Dynamic power is necessary to maintain stability of the aircraft. Because prior flight controllers have been designed for use with batteries, which can supply power on demand without an external control (e.g., throttle) and instantaneously, prior flight controllers do not regulate how quickly power demands change. In the event of battery failure in the typical series-hybrid multirotor aircraft, the aircraft is likely to crash because the battery is not available to provide power regulation. In some embodiments, the problem of slow genset response can be mitigated by integrating the control of the genset throttle (regulating power production) with the flight controller (regulating power demand). Power demand can be matched to power production if the controller has authority over both.

An improved flight controller is disclosed. For example, a flight controller of an aircraft vehicle regulates power generation and power utilization to eliminate reliance on battery power when using a generator with a throttle delay. The flight controller includes an electronic speed control (ESC) throttle input from which an anticipated electrical power demand is determined. For example, based on control inputs from a user and detected sensor data, the throttle settings to be applied to electric motors to achieve desired propeller speeds are determined and the associated anticipated power demand is determined. Examples of the anticipated electrical power demand include predicted electrical power demand, estimated electrical power demand and any other calculated electrical power demand. In various embodiments, the anticipated electrical power demand is at least in part determined by the flight controller and/or another processor included on the aircraft vehicle. The controller determines a throttle input (e.g., engine throttle input) for a generator in order to satisfy the anticipated electrical demand. For example, engine throttle required to produce the anticipated electrical demand is determined and applied. The flight controller includes an electronic speed control throttle output providing a delayed electronic speed control throttle signal. For example, rather than allowing the electrical motor throttle to instantaneously change, the electrical motor throttle is allowed to change in a manner that matches the power output delay of the generator. By delaying the change in electronic speed control throttle, the increase in power demand from the change in the electronic speed control throttle can be matched to the delay in power increase provided by the generator in response to the generator throttle input.

FIG. 1A is a diagram illustrating an embodiment of components of a multirotor aircraft system. This is merely an example and components of the multirotor aircraft system have been shown. The shown signal paths are merely examples and other signal paths may exist in various embodiments. Any number of any of the components shown in FIG. 1A may exist in various embodiments. Any of the components shown in FIG. 1A may be integrated in the same physical component. In some embodiments, a component shown in FIG. 1A represents multiple physical components.

Generator 102 includes an engine, an alternator, and a rectifier. The generator produces electrical energy that can be utilized to power one or more motors. The engine of the generator may be a prime mover such as an internal combustion engine or a turbine engine that utilizes chemical fuels (e.g., gasoline, diesel, hydrogen, natural gas, etc.). The alternator converts mechanical energy provided by the engine to alternating current and the rectifier (or any other AC/DC converter) converts this alternating current to direct current. In various other embodiments, other types of generators may be utilized. For example, a hydrogen fuel cell is utilized in a generator. In another example, a hydrogen internal combustion engine is utilized in a generator. In another example, the generator does not include an AC/DC converter and provides AC power output. In yet another example, the generator may include a capacitor for short term energy storage.

The electric power provided by generator 102 is used to drive electronic speed control units 106 that control electric motors 108. Motors 108 are each attached to a propeller that provides thrust to enable an aircraft vehicle to fly. Four sets of electronic speed control units and motors are shown. In various other embodiments, any number of electronic speed control units and control electric motors may be utilized. In some embodiments, a single electronic speed control unit may control a plurality of motors. In the example shown, speed, attitude (e.g., orientation), altitude, and/or other movement parameters may be controlled by individually varying the amount of throttle provided to each electronic speed control unit that controls the speed of a connected motor. There may be drastic shifts in the amount of power required by motors 108 as an aircraft performs flight maneuvers and compensates for environmental factors such as wind.

The amount of power provided by generator 102 is regulated by a throttle input (e.g., engine throttle input) to a component of generator 102. However, any change in power output from generator 102 in response to a change in throttle input is delayed. For example, due to the time required to change the pressure in the intake manifold of an internal combustion engine, power output change is delayed. In some embodiments, battery 110 is utilized to smooth out and handle almost instantaneous power demands. Battery 110 may be charged by power provided by generator 102. In some embodiments, battery 110 is to be utilized as a backup power source in the event generator 102 becomes unavailable. For example, power from generator 102 is typically delivered to ESC units 106 without the use of battery 110 but in the event generator 102 becomes unavailable, power stored in battery 110 is provided to enable the aircraft to navigate and land safely. In some embodiments, battery 110 is not included and not utilized. In some embodiments, rather than or in addition to utilizing battery 110, one or more capacitors are utilized to smooth out and handle power demands.

Flight controller 104 provides throttle signals to each of ESC units 106 to control the delivered power and speed of respective connected motors 108. These ESC throttle signals are generated to maintain vehicle stability as well as execute a desired flight path. Flight controller 104 receives inputs from a user pilot controller (e.g., controller commands) and sensors that detect the state of the vehicle (e.g., accelerometers, gyroscopes, Global Positioning System sensors, etc.) and determines the ESC throttle control signals based on these inputs to achieve a desired vehicle state. One or more sensors may be integrated into flight controller 104 and one or more sensors may be external to flight controller 104. In addition to controlling the electric motors of the vehicle, flight controller 104 also provides a throttle signal to a component of generator 102 to dynamically control the power output of generator 102. By having control of both the generator and motors that are consuming the power of the generator (e.g., load of generator), power production and power consumption can be controlled to be matched such that a battery power source is not required.

In some embodiments, flight controller 104 anticipates new power requirements to execute pilot commands and instructs generator 102 to provide the anticipated power. However, the ESC throttle signals that trigger consumption of the anticipated power are delayed until generator 102 is able to actually provide the anticipated power. By not allowing power demand from motors to exceed the power provided by generator 102, other sources of power that bridge the throttle delay (e.g., battery power) are not required. Flight controller 104 also monitors the system to compensate for any deviations from a desired state. For example, the RPM of an engine of generator 102 is monitored to ensure it is operating at a desired RPM (e.g., within a desired RPM range) and the throttle provided to generator 102 is adjusted to correct any deviations. In another example, the current and/or voltage provided by one or more components of generator 102 is detected and compared with a desired output current and/or voltage and the throttle provided to generator 102 is adjusted to correct any deviations. In some embodiments, the current provided to each of ESC units 106 and the speed/RPM of each of motors 108 are monitored to determine current power demand and/or to detect and correct any deviations from a desired state.

Figure 1B:
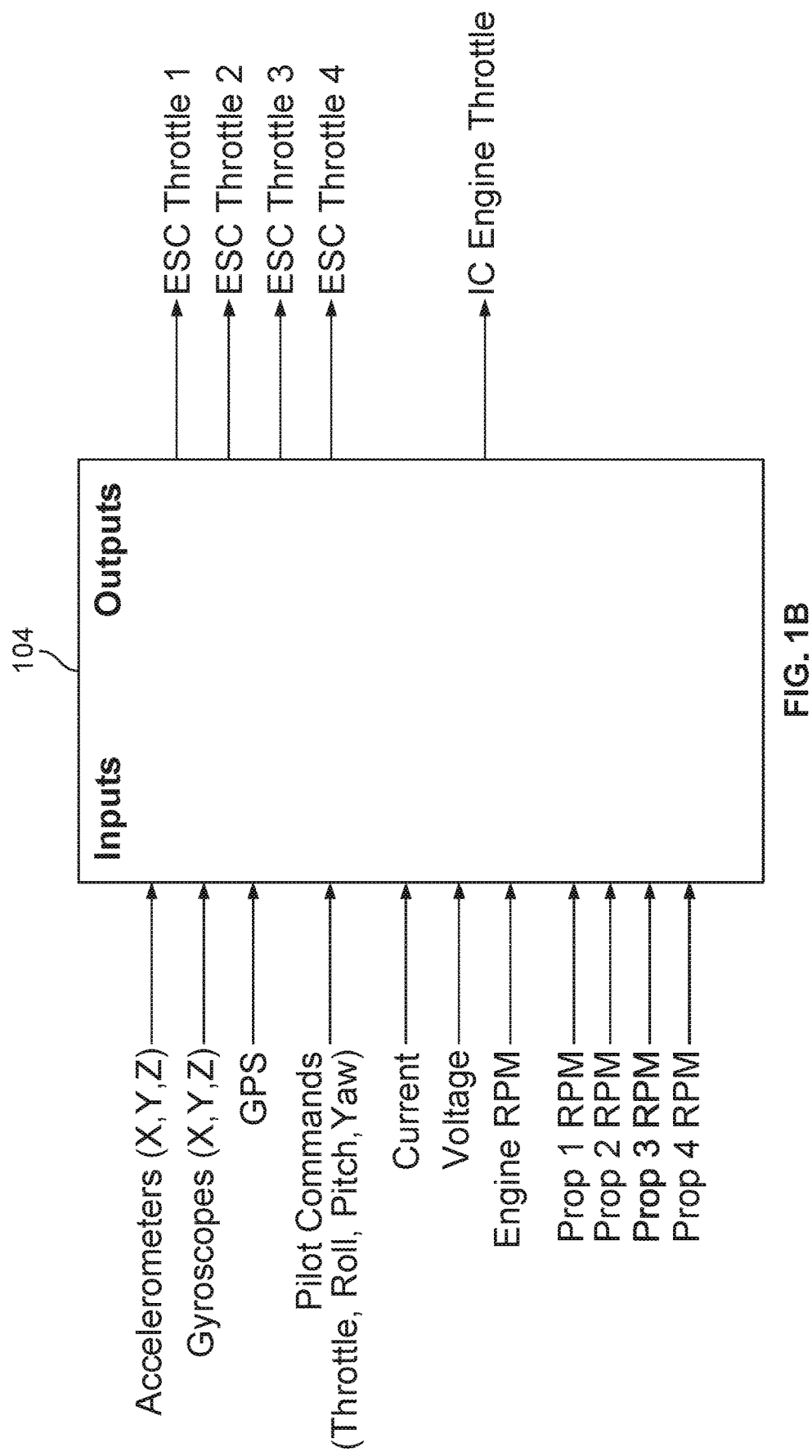
FIG. 1B is a diagram illustrating an embodiment of flight controller 104 of FIG. 1A.

FIG. 1B is a diagram illustrating an embodiment of flight controller 104 of FIG. 1A. The example of flight controller 104 shown in FIG. 1B shows its various inputs and outputs.

Figure 2:
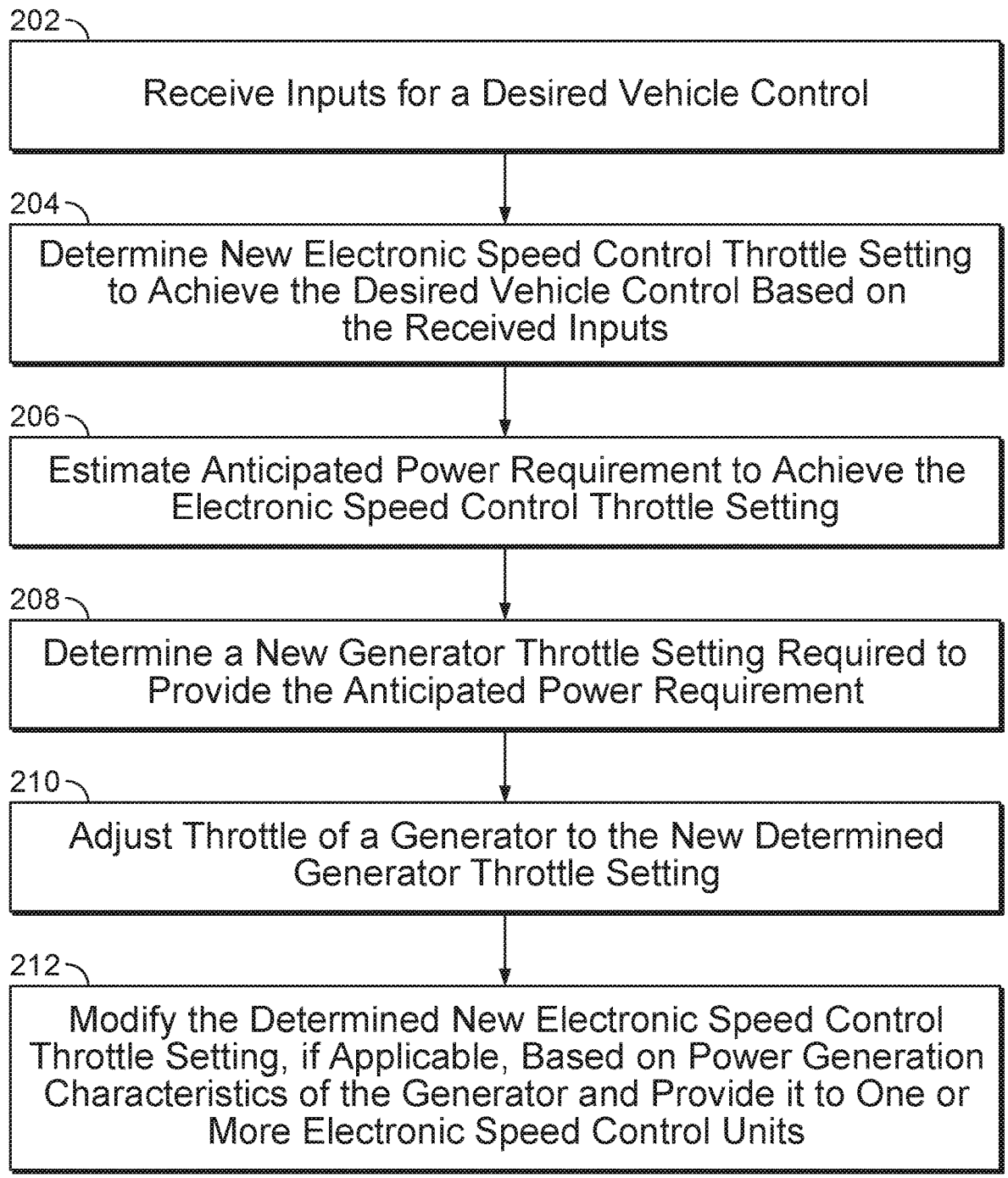
FIG. 2 is a flowchart illustrating an embodiment of a process for modifying an electronic speed control signal to match a generator output.
Figure 3:
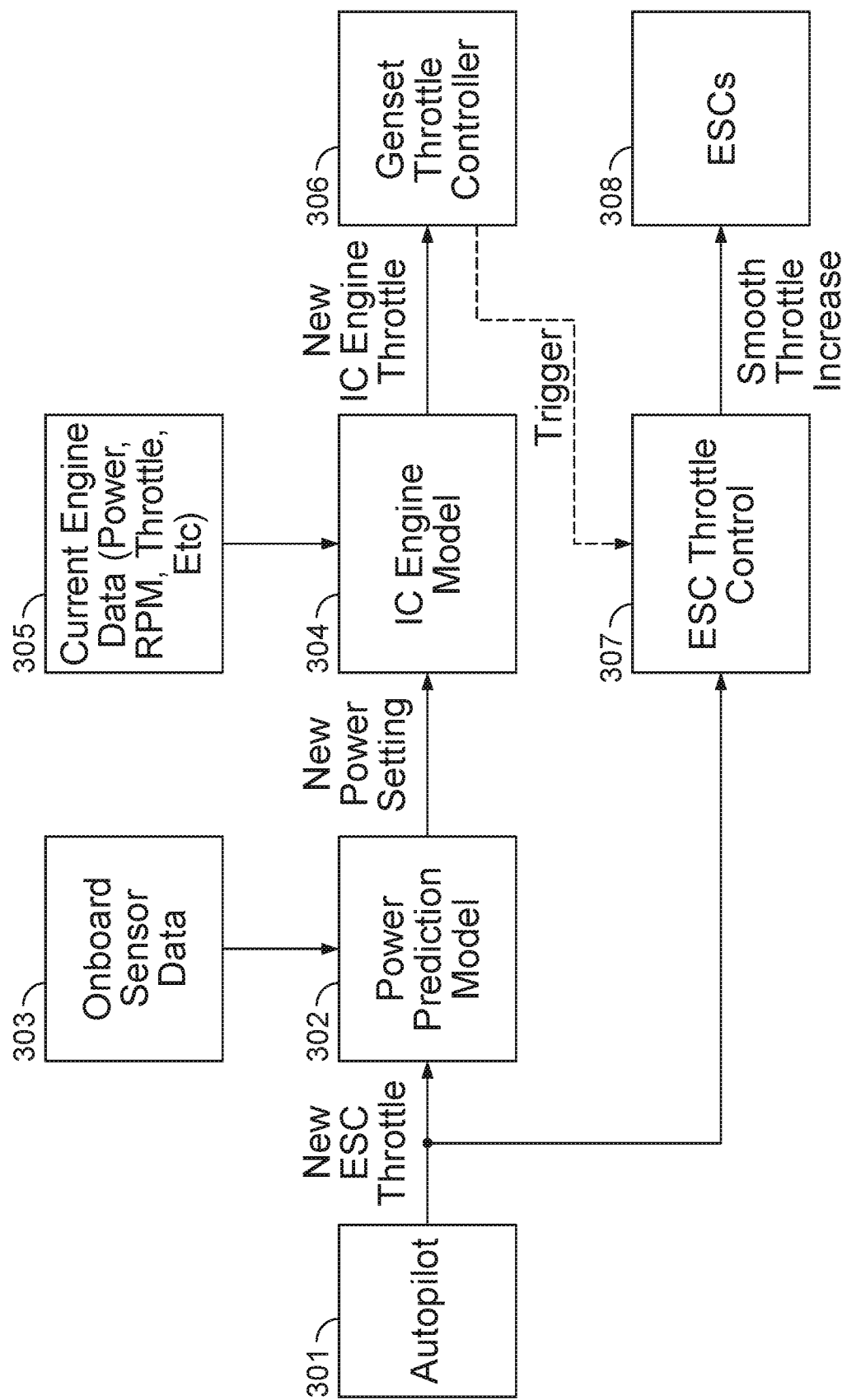
FIG. 3 is a block diagram illustrating functional blocks for controlling a generator throttle in conjunction with ESC throttles.

FIG. 2 is a flowchart illustrating an embodiment of a process for modifying an electronic speed control signal to match a generator output. The process of FIG. 2 may be at least in part implemented on flight controller 104 of FIGS. 1A and 1B. FIG. 3 is a block diagram illustrating functional blocks for controlling a generator throttle in conjunction with ESC throttles. The functional blocks of FIG. 3 may be at least in part implemented on flight controller 104 of FIGS. 1A and 1B. In some embodiments, the functional blocks of FIG. 3 illustrate the process of FIG. 2.

At 202 of FIG. 2, inputs for a desired vehicle control are received. For example, the inputs to be utilized to determine movement control of an aircraft or other type of vehicle are received. In some embodiments, the inputs include pilot commands from a pilot or other user. For example, wireless signal indicating an input from a handheld stick controller is received. In some embodiments, the inputs include autopilot commands (e.g., to navigate to a waypoint). In some embodiments, the inputs include flight computer (e.g., PID controller) commands to maintain vehicle stability. In some embodiments, the inputs include sensor data indicating a state of a vehicle or an environment of the vehicle. For example, sensor data including accelerometer, gyroscope, and/or Global Positioning data is received. In some embodiments, the inputs include flight restriction data. For example, restrictions on flight location or altitude based on structural or governmental regulations are received. In some embodiments, using the inputs, one or more ESC throttle levels required to achieve the desired control are determined.

At 204 of FIG. 2, a new electronic speed control throttle setting to achieve the desired vehicle control is determined based on the received inputs. For example, the ESC throttle setting includes each individual setting for each different ESC unit to achieve the desired vehicle control. This may be determined using a flight control subsystem that utilizes the received inputs to determine a set point setting for each electronic speed control throttle. In the example of FIG. 3, autopilot block 301 represents the determination and output of the new electronic speed control throttle setting.

In some embodiments, the determined new electronic speed control throttle setting is limited by an intermediate limit that is less than a maximum electronic speed control throttle setting. For example, the determined electronic speed control throttle setting is limited from being larger than 90% of the absolute maximum electronic speed control throttle setting. By reserving headroom for electronic speed control throttle, extra electronic speed control capability is reserved for critical uses such as maintaining flight stability or performing emergency maneuvers that may require extra power.

At 206 of FIG. 2, an anticipated power requirement to achieve the electronic speed control throttle setting is estimated. For example, using a power prediction model for a particular vehicle/motors to be controlled, the anticipated power requirement needed to achieve the new electronic speed control throttle setting is determined. In some embodiments, estimating the anticipated power requirement includes determining a power requirement difference between a current power output and the new anticipated power requirement. In some embodiments, the power requirement difference is calculated based on sensor data characterizing a state of the vehicle to be controlled. For example, current ESC throttle settings, current total power consumption, the current and RPM of each of the electric motors, and/or other available sensor data is utilized to calculate the power requirement difference. In the example of FIG. 3, power prediction model block 302 represents the determination and output of the anticipated power requirement using sensor data 303.

At 208 of FIG. 2, a new generator throttle setting required to provide the anticipated power requirement is determined. In some embodiments, determining the new generator throttle setting includes determining a change in generator throttle setting required to generate the anticipated power requirement. In various embodiments, information on current settings, performance of one or more components of the generator, and/or sensor data (e.g., environmental data, fuel system sensor data, etc.) is utilized in determining the new generator throttle setting. For example, using an engine model (e.g., specific to an engine of the generator) that maps generator power output to generator throttle setting given various condition inputs, the generator throttle that matches the estimated power requirement is identified. The condition inputs to the engine model may include current engine RPM and fuel system measurements (e.g., atmospheric temperature, atmospheric pressure, humidity, mass air flow, etc.) of an engine. In some embodiments, determining the new generator throttle setting includes determining a generator performance parameter (e.g., engine RPM, output voltage, output current, etc.) that corresponds to the estimated power requirement. In the example of FIG. 3, engine model block 304 represents using current engine data 305 to determine and output the determined generator throttle setting.

In some cases, required changes in power consumption by the electric motors to maintain flight stability may happen much faster than how fast power output of a generator can change. In some embodiments, the new generator throttle setting has been selected to be greater than the minimum generator throttle setting required to provide the estimated power requirement to allow for reserve power. For example, by increasing an engine throttle of a generator beyond the power requirements, the engine RPM is increased and energy is effectively stored in the engine as inertial energy.

In some embodiments, the new generator throttle setting is limited by an intermediate limit that is less than a maximum generator setting. For example, the new generator throttle setting is limited from being larger than 90% of the maximum generator throttle setting. By reserving headroom for generator throttle, extra generator capability is reserved for critical uses such as maintaining flight stability or performing emergency maneuvers that may require extra power.

At 210 of FIG. 2, throttle of a generator is adjusted to the new determined generator throttle setting. For example, a genset throttle controller is instructed to implement the determined generator throttle setting. In some embodiments, the throttle of the generator is adjusted based on feedback to correct any deviations. For example, using feedback signals, the throttle of the generator is modified to correct any deviation in power output performance of the generator. In the example of FIG. 3, the determined generator throttle setting of block 304 is provided to genset throttle controller 306 to control the throttle of a generator.

At 212 of FIG. 2, the determined new electronic speed control throttle setting is modified, if applicable, based on power generation characteristics of the generator and provided to one or more electronic speed control units. For example, in a control signal to be provided to an ESC unit, the new electronic speed control throttle setting for the ESC unit is delayed by an amount corresponding to an engine throttle lag.

In some embodiments, it is determined whether the anticipated power requirement is small enough to implement the determined electronic speed control throttle setting without modification. For example, if the anticipated power requirement is less than a current power output of the generator, the electronic speed control throttle setting is not delayed/modified since the anticipated power requirement is less than the current power output of the generator. In another example, if the anticipated power requirement is less than a threshold, the electronic speed control throttle setting is not delayed/modified because the generator is able to handle the anticipated power requirement from its reserved energy (e.g., reserved inertial energy of engine) and/or handle the anticipated power requirement without causing a failure (e.g., estimated power requirement small enough to not cause an engine stall).

In some embodiments, modifying the new electronic speed control throttle setting includes delaying an increase to the electronic speed control throttle in one or more control signals provided to one or more electronic speed control units. The amount of delay may be dynamically determined based on one or more properties of one or more components of the generator and/or sensor data. In some embodiments, the delay value corresponds to a throttle lag of the generator calculated using an engine model. For example, using an engine model specific to an engine of the generator, the delay value is calculated based on the anticipated power requirement given various generator status inputs (e.g., current engine RPM, fuel system measurements, etc.). In some embodiments, delaying the new electronic speed control throttle setting includes delaying the new electronic speed control throttle setting by the determined delay in response to an adjustment of the generator throttle. For example, detection of the generator throttle adjustment triggers the delay by the determined delay value starting from when the generator throttle was adjusted.

In some embodiments, modifying the new electronic speed control throttle setting includes modifying a rate of change to the electronic speed control throttle. For example, rather than an abrupt step-wise change to the electronic speed control throttle from a previous electronic speed control throttle setting, the transition is performed more smoothly/gradually. For example, the rate of change of the electronic speed control throttle is limited by a maximum rate of change limit. This rate of change limit may be fixed or dynamically determined based on one or more properties of the generator and/or sensor data??. In some embodiments, the rate of change limit is only applied to increases to electronic speed control throttle and not decreases to electronic speed control throttle.

In some embodiments, the rate of change of the electronic speed control throttle is adjusted in real-time based on feedback such as deviations of engine RPM for its current ideal value. In some embodiments, the magnitude of the correction to the rate of change of the ESC throttle is a function of the engine speed error. For example, during an increase in power, the magnitude of the rate of change increases with increasing engine speed, and during a decrease in power, the magnitude of the rate of change increases with decreasing engine speed.

In some cases, by limiting the rate of change, the increase in power demand is better matched to the rate at which power provided by the generator can increase. For example, when additional power is requested to the generator via a higher generator throttle setting, the increase in output power is both delayed and change rate limited. By also limiting the rate of change in the increase of the electronic speed control throttle, the delay in the start of the increase does not have to extend until the output power of the generator has completed its transition, but rather the increase of the electronic speed control throttle can begin as soon as the output power of the generator begins to increase at a rate limit proportional to the rate of increase of the generator power output.

In the example of FIG. 3, ESC throttle control block 307 represents the modification and output of the new ESC throttle setting triggered by genset throttle controller 306. The modified ESC throttle setting is provided to ESCs 308.

Figure 4:
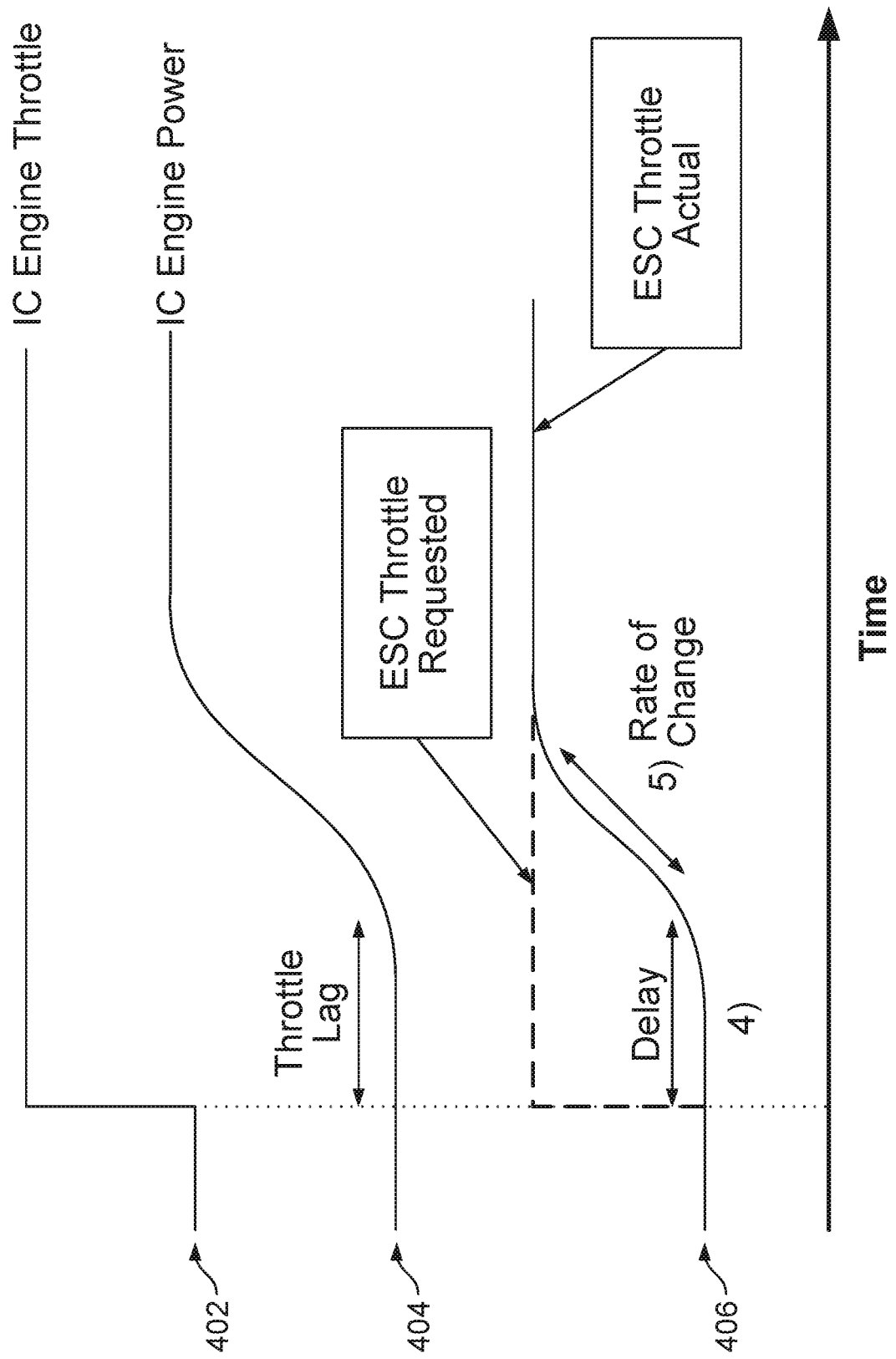
FIG. 4 is a graph illustrating an example of delaying and limiting a rate of change of an electronic speed control throttle setting.

FIG. 4 is a graph illustrating an example of delaying and limiting a rate of change of an electronic speed control throttle setting. Graph 402 shows generator throttle (e.g., engine throttle) being increased at time "t." For example, at time "t," the throttle of a generator is adjusted to the determined new generator throttle setting in 210 of FIG. 2.

Graph 404 shows the power output of the generator in response to the throttle increase shown in graph 402. Although generator throttle was increased at time "t," there is a lag in time (throttle lag) from time "t" to when the power output of the generator actually starts to increase in response to the throttle increase. The rate of increase in power after the lag is also not instantaneous. The power is increased at a limited rate until the stable power output corresponding to the throttle is reached.

Graph 406 shows a control signal of the electronic speed control throttle setting that has been modified due to the delayed power output response of the generator. For example, the modification performed in 212 of FIG. 2 is shown. The dashed line of graph 406 shows the new desired electronic speed control throttle setting instantaneously requesting the new electronic speed control throttle setting at time "t" to coincide with the request for the increase in generator throttle shown in graph 402. However, as shown in graph 404, new additional power is not available until after the throttle lag. By requesting power before it is available, the engine of a generator may stall. In order to match the power request of the new electronic speed control throttle setting to the change in the power output of the generator, the new electronic speed control throttle setting is delayed and the rate of change limited as shown in graph 406. This delay and limit in rate of change corresponds to the expected throttle lag and limit in power output change of the generator as exhibited by graph 404. The delay and limit in rate of change may vary based on operating conditions of one or more components of the generator.

Figure 5:
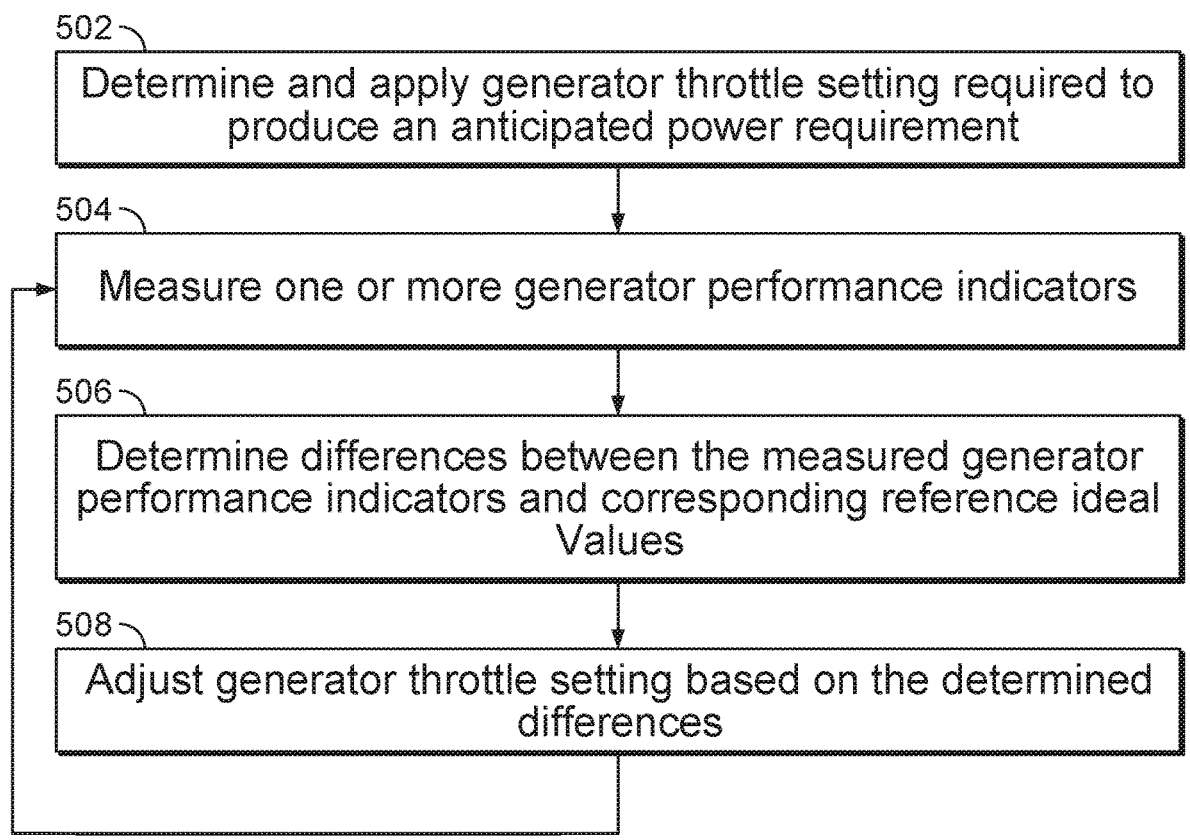
FIG. 5 is a flowchart illustrating an embodiment of a process for adjusting a throttle of a component of a generator based on feedback.
Figure 6:
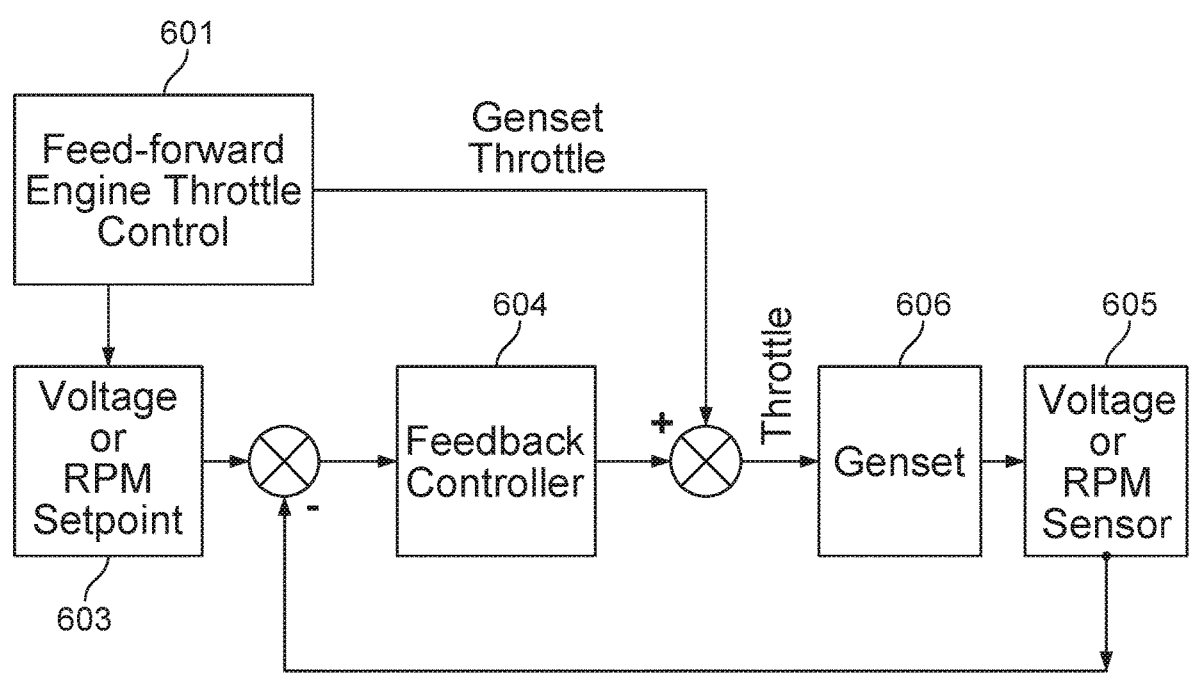
FIG. 6 is a block diagram illustrating functional blocks for adjusting a throttle of a component of a generator based on feedback.

FIG. 5 is a flowchart illustrating an embodiment of a process for adjusting a throttle of a component of a generator based on feedback. The process of FIG. 5 may be at least in part implemented on flight controller 104 of FIGS. 1A and 1B. In some embodiments, the process of FIG. 5 is at least in part included in 210 of FIG. 2. FIG. 6 is a block diagram illustrating functional blocks for adjusting a throttle of a component of a generator based on feedback. The functional blocks of FIG. 6 may be at least in part implemented on flight controller 104 of FIGS. 1A and 1B. In some embodiments, the functional blocks of FIG. 6 illustrate the process of FIG. 5.

At 502 of FIG. 5, the generator throttle setting required to produce an anticipated power requirement is determined and applied. For example, the anticipated power requirement is determined in 206 of FIG. 2, the required generator throttle setting is determined in 208 of FIG. 2, and the required generator throttle setting is implemented in 210 of FIG. 2. In some embodiments, in the process of determining the required generator throttle setting, one or more generator performance parameters (e.g., engine RPM, output voltage of generator, output current of generator, etc.) that correspond to the target production of power requirement are determined. In the example of FIG. 6, feed-forward engine throttle control module 601 determines and provides the required generator throttle setting that is provided to genset component 606 of a generator. Module 601 also determines the one or more generator performance parameters shown in the example as reference target voltage or RPM 603.

At 504 of FIG. 5, one or more generator performance indicators are measured. Examples of the generator performance indicators include engine RPM, output voltage, output current, and other electrical or mechanical properties of one or more components of a generator. In the example of FIG. 6, voltage or RPM sensor 605 measures generator performance parameters such as output voltage or engine RPM.

At 506 of FIG. 5, differences between the measured generator performance indicators and corresponding reference ideal values are determined. For example, it is determined whether the detected generator performance deviates from an expected generator performance corresponding to the reference values.

At 508 of FIG. 5, the generator throttle setting is adjusted based on the determined differences. For example, in order to reduce deviations of the measured generator performance indicators from corresponding reference values, the generator throttle setting is adjusted. The amount of adjustment may be determined based at least in part on the magnitude of the determined differences. For example, using an engine model that maps performance indicator difference values to generator throttle setting adjustment values, the generator throttle adjustment magnitude value that matches determined differences is identified. The engine model may also take into account current engine RPM and fuel system measurements (e.g., atmospheric temperature, atmospheric pressure, humidity, mass air flow, etc.). In the example shown in FIG. 6, detected sensor data of sensor 605 and the reference target voltage or RPM 603 are provided as inputs to feedback controller 604 to adjust the genset throttle provided to genset 606. An example of feedback controller 604 includes a proportional-integral-derivative (PID) controller.

The process of FIG. 5 returns to 504 where feedback is utilized to continually correct any generator performance deviations.

Figure 7:
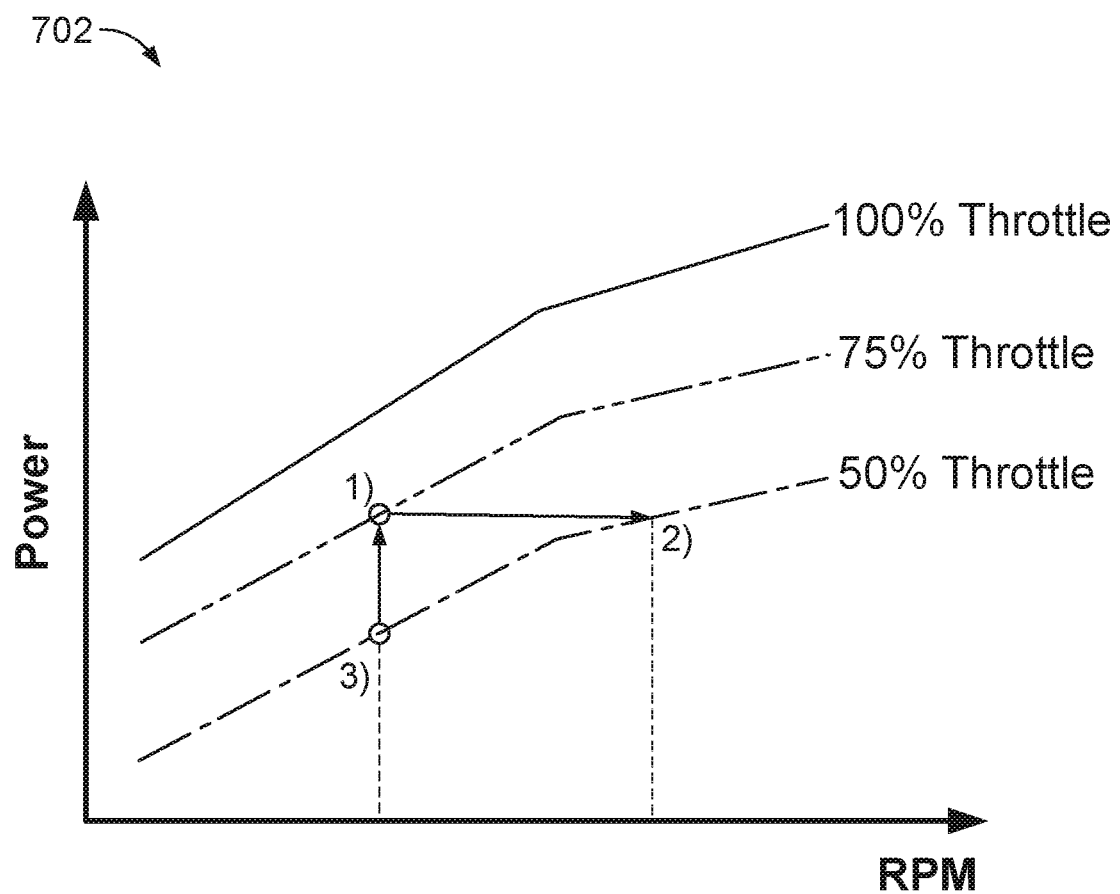
FIG. 7 is graph illustrating an example of adjusting generator throttle to increase generator throttle headroom.

FIG. 7 is graph illustrating an example of adjusting generator throttle to increase generator throttle headroom. In some embodiments, it is desirable to operate the generator throttle at a value such that there is sufficient space to increase throttle in order to be able to meet sudden increases in load power demand (e.g., maintain headroom). In some embodiments, to meet increased power demand, increasing engine torque of a motor of the generator is preferable to increasing engine RPM because the former gives faster power response.

FIG. 7 shows a graph 702 illustrating a power-RPM graph at various throttle levels. As shown in graph 702, the same power can be maintained by either operating at point 1 or point 2 on graph 702. Although the power is the same, the throttles are different. By operating at point 2 rather than at point 1, throttle can be reduced from 75% to 50% and throttle headroom is gained at the cost of higher engine RPM. Because a flight controller such as controller 104 of FIG. 1A has control over both generator throttle and engine load (e.g., ESC throttle), it is possible for the flight controller to choose the operating point of the engine of the generator. By being at a lower throttle, when an increase in output power is requested, the flight controller can simply increase the engine throttle and the output power is increased at constant RPM, providing the fastest response. Immediately after, the flight controller can re-adjust the engine operating point to a higher RPM and lower engine throttle, so as to increase generator throttle headroom.

In the example shown in graph 702, starting from point 3 to point 1, generator throttle is increased (e.g., from 50% to 75%) and ESC throttles are increased such that the engine maintains constant RPM. This transition provides the fastest increase in power output (e.g., increasing engine torque at constant RPM). Then moving from point 1 to point 2, throttle headroom is regained by increasing engine RPM and lowering generator throttle (e.g., from 75% to 50%) at constant output power. This is accomplished by a controlled decrease of ESC throttles to reduce the torque on the engine, increase the engine RPM and DC link voltage, and decrease the generator throttle such that the power supplied to the electric motors equals the required amount of power while RPM is increased. Similarly, engine RPM can be decreased as the vehicle burns fuel and becomes lighter, in order to decrease wear or fuel consumption that might be associated with operating at higher engine RPM, provided that sufficient throttle headroom is available. The ability to vary engine RPM may be utilized to optimize fuel efficiency and reduce wear, while maintaining sufficient power response for normal flight.

Figure 8:
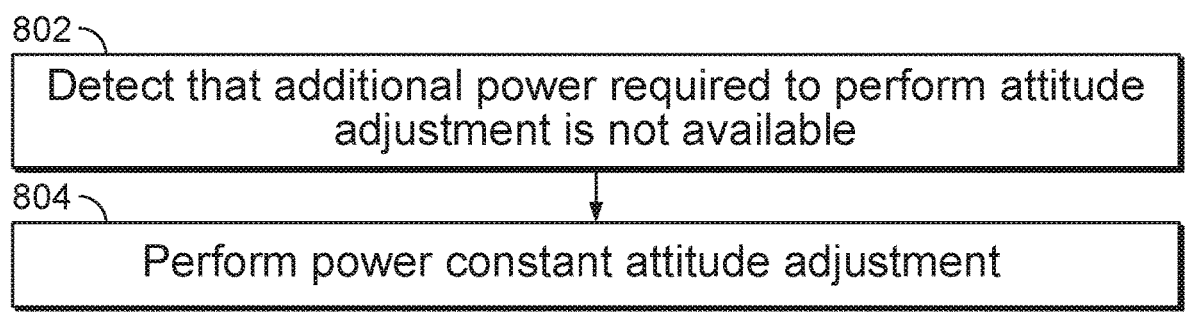
FIG. 8 is a flowchart illustrating an embodiment of a process for performing power constant attitude adjustment.

FIG. 8 is a flowchart illustrating an embodiment of a process for performing power constant attitude adjustment. The process of FIG. 8 may be at least in part implemented on flight controller 104 of FIGS. 1A and 1B. In some embodiments, the process of FIG. 8 is at least in part included in 204 and/or 208 of FIG. 2.

At 802 it is detected that additional power required to perform attitude adjustment is not available. Performing attitude adjustment may include stabilizing an aircraft. For example, attitude adjustment (e.g., aircraft orientation adjustment) can be contrasted with altitude adjustment (e.g., flight height adjustment). As previously described, required changes in power consumption by the electric motors to maintain flight stability may need to happen much faster than how fast power output of a generator can be changed. However, when factors such as wind destabilize an aircraft, the aircraft needs to make a quick attitude adjustment to compensate for the destabilization. For example, the generator throttle may have reached a maximum value and additional power is not available from the generator to perform required attitude adjustment. In another example, quick attitude adjustment is required to maintain flight stability of an aircraft and the generator will not be able to provide additional power fast enough within the time required to perform the attitude adjustment.

At 804, power constant attitude adjustment is performed. While the total power consumption cannot easily change due to limitation of the generator, the power of each individual electric motor can be varied quickly as long as the total amount of power of all of the motors does not exceed the available power. For example, rather than requiring an increase in power consumption to perform the attitude adjustment, the overall power requirement is kept constant or even reduced while still performing the attitude adjustment. In some embodiments, although the amount of power supplied to each ESC unit is varied to perform the necessary attitude adjustment to stabilize the aircraft, the total electric power is kept equal to the power available from the generator. For example, the total amount of power that is kept constant is budgeted between altitude control and attitude control and the amount of power available for altitude control is reduced (e.g., resulting in lowering of the aircraft) while the amount of power available for attitude control is increased. This may result in loss of altitude of the aircraft but the loss in altitude may be regained once additional power is available (e.g., via delay in increase power output from the generator in response to generator throttle increase) or the aircraft has been stabilized (e.g., redistribute additional power budget back to altitude control once aircraft is stabilized). In some embodiments, performing power constant attitude adjustment may effectively result in decreased constant ESC throttle to every ESC to make power available to attitude control.

Although examples and embodiments have been discussed with respect to aircraft vehicles and flight controllers, other types of vehicles (e.g., terrain vehicle, airplane vehicle, watercraft vehicle, hover vehicle, vertical takeoff and landing (VTOL) vehicle, etc.) and controllers may utilize the improvements described herein to manage consumption and generation of power from a source that exhibits a delayed power output response in response to a throttle change.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   an electronic speed control throttle input from which an anticipated electrical power demand required to satisfy the electronic speed control throttle input is determined;
   a controller that determines a throttle input for a generator in order to satisfy the anticipated electrical power demand and sets the generator to the determined throttle input, wherein the generator includes an engine; and
   an electronic speed control throttle output providing a modified electronic speed control throttle signal that is generated for at least one electric motor to at least in part intentionally delay an associated requested power change to correspond to a power output change delay of the generator, wherein the delay in the associated requested power change is associated with the power output change delay of the generator in response to the setting of the generator to the determined throttle input, and the modified electronic speed control throttle signal is provided to control the at least one electric motor of an aircraft, and wherein the delay in the associated requested power change of the modified electronic speed control throttle signal prevents the electronic speed control throttle input from causing a power demand change to cross a level associated with an available amount of power at least in part limited by the power output change delay of the engine for the at least one electric motor of the aircraft.

2. The system of claim 1, wherein the aircraft is a multirotor aircraft and the electronic speed control throttle output is one of a plurality of electronic speed control throttle outputs determined by the system and provided to various electric motors of the multirotor aircraft.

3. The system of claim 1, wherein the electronic speed control throttle output is one of a plurality of electronic speed control throttle outputs that are at least in part delayed in a corresponding associated requested power change associated with the power output change delay of the generator.

4. The system of claim 1, wherein the throttle input for the generator is an engine throttle input.

5. The system of claim 1, wherein the modified electronic speed control throttle signal is delayed with respect to the setting of the generator to the determined throttle input.

6. The system of claim 1, wherein a rate of change of an electronic speed control throttle signal setting in the modified electronic speed control throttle signal has been altered to be limited by a maximum rate of change.

7. The system of claim 1, wherein the electronic speed control throttle input was determined based at least in part on a pilot control command indicating a desired flight control.

8. The system of claim 1, wherein the anticipated electrical power demand was determined based at least in part using a power prediction model that takes into account detected states of the aircraft.

9. The system of claim 1, wherein the throttle input was determined based at least in part on current engine RPM and one or more fuel system measurements of the engine of the generator.

10. The system of claim 1, wherein the throttle input is limited by a maximum limit that is less than a maximum throttle of the generator.

11. The system of claim 1, wherein the throttle input has been determined to be greater than a minimum throttle input required to satisfy the anticipated electrical power demand.

12. The system of claim 1, wherein the at least one electric motor of the modified electronic speed control throttle signal is powered without a use of a battery.

13. The system of claim 1, further comprising a backup battery configured to be utilized in the event the generator becomes not functional.

14. The system of claim 1, wherein engine RPM of the engine of the generator is increased and the throttle input for the generator is decreased while maintaining a substantially constant generator power output.

15. The system of claim 1, wherein the throttle input for the generator is adjusted based on detected electrical output feedback.

16. The system of claim 1, wherein the modified electronic speed control throttle signal was generated in response to a determination that the anticipated electrical power demand is greater than a current electrical power demand by at least a threshold amount.

17. The system of claim 1, wherein the modified electronic speed control throttle signal was delayed in response to a determination that a battery is not fully functional.

18. The system of claim 1, wherein in response to a determination that additional power is not available, an altitude control power budget is reduced and an attitude control power budget is increased within a constant total power budget of power provided by the generator.

19. A method, comprising:
    determining using an electronic speed control throttle input, an anticipated electrical power demand required to satisfy the electronic speed control throttle input;
    determining using a flight controller a throttle input for a generator in order to satisfy the anticipated electrical power demand;
    setting the generator to the determined throttle input, wherein the generator includes an engine; and
    providing via the flight controller a modified electronic speed control throttle signal that is generated for at least one electric motor to at least in part intentionally delay an associated requested power change to correspond to a power output change delay of the generator, wherein the delay in the associated requested power change is associated with the power output change delay of the generator in response to the setting of the generator to the determined throttle input, and the modified electronic speed control throttle signal is provided to control the at least one electric motor of an aircraft, and wherein the delay in the associated requested power change of the modified electronic speed control throttle signal prevents the electronic speed control throttle input from causing a power demand change to cross a level associated with an available amount of power at least in part limited by the power output change delay of the engine for the at least one electric motor of the aircraft.

20. A system, comprising:
a generator; and
a controller configured to:
    determine using an electronic speed control throttle input, an anticipated electrical power demand required to satisfy the electronic speed control throttle input;
    determine a throttle input for the generator in order to satisfy the anticipated electrical power demand;
    set the generator to the determined throttle input, wherein the generator includes an engine; and
    provide a modified electronic speed control throttle signal that is generated for at least one electric motor to at least in part intentionally delay an associated requested power change to correspond to a power output change delay of the generator, wherein the delay in the associated requested power change is associated with the power output change delay of the generator in response to the setting of the generator to the determined throttle input, a rate of change of an electronic speed control throttle signal setting in the modified electronic speed control throttle signal has been limited by a maximum rate of change, and the modified electronic speed control throttle signal is provided to control the at least one electric motor of an aircraft, and wherein the delay in the associated requested power change of the modified electronic speed control throttle signal prevents the electronic speed control throttle input from causing a power demand change to cross a level associated with an available amount of power at least in part limited by the power output change delay of the engine for the at least one electric motor of the aircraft.

\* \* \* \* \*